Aug. 26, 1924.
A. E. COURTNEY
1,506,410
LAWN EDGE TRIMMER
Filed July 18, 1922    2 Sheets-Sheet 1
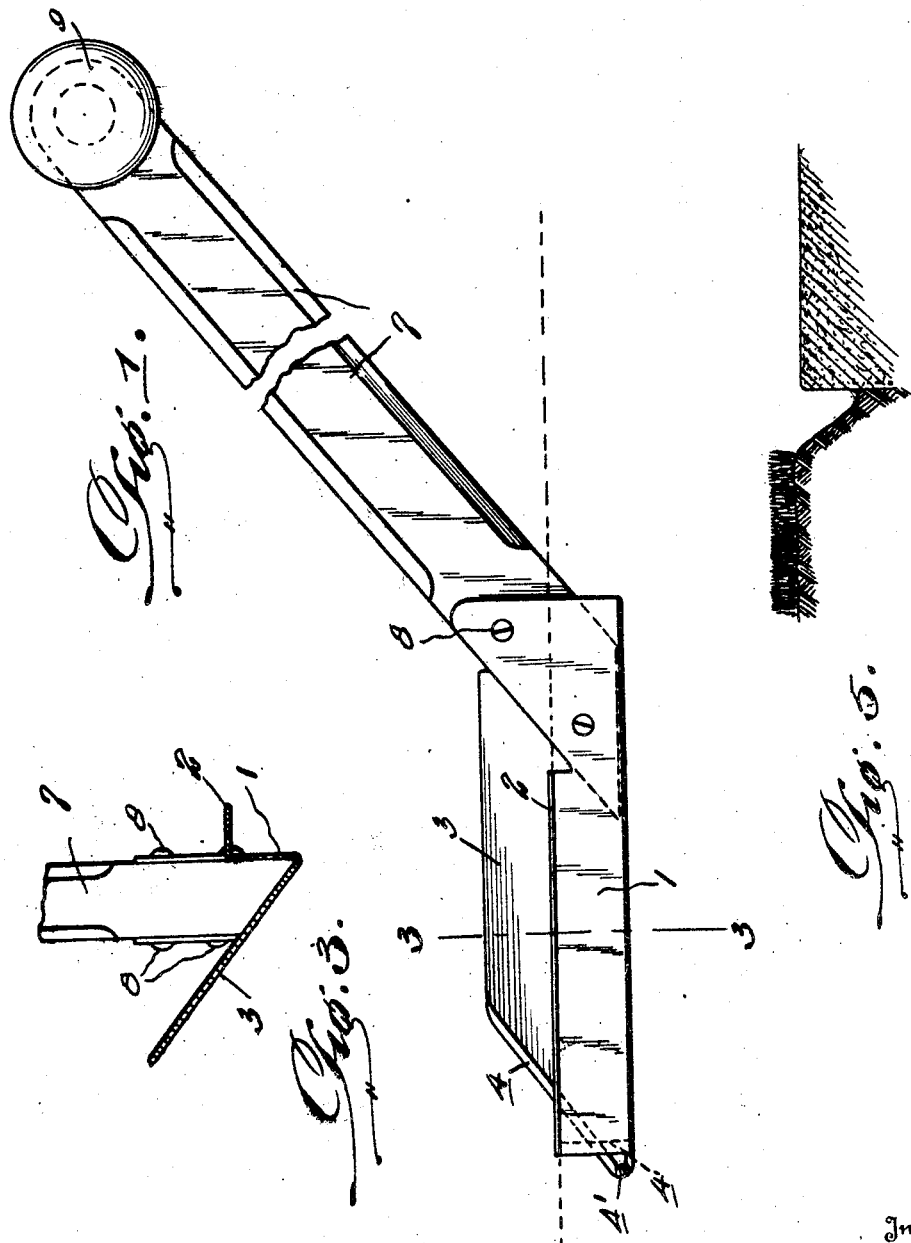

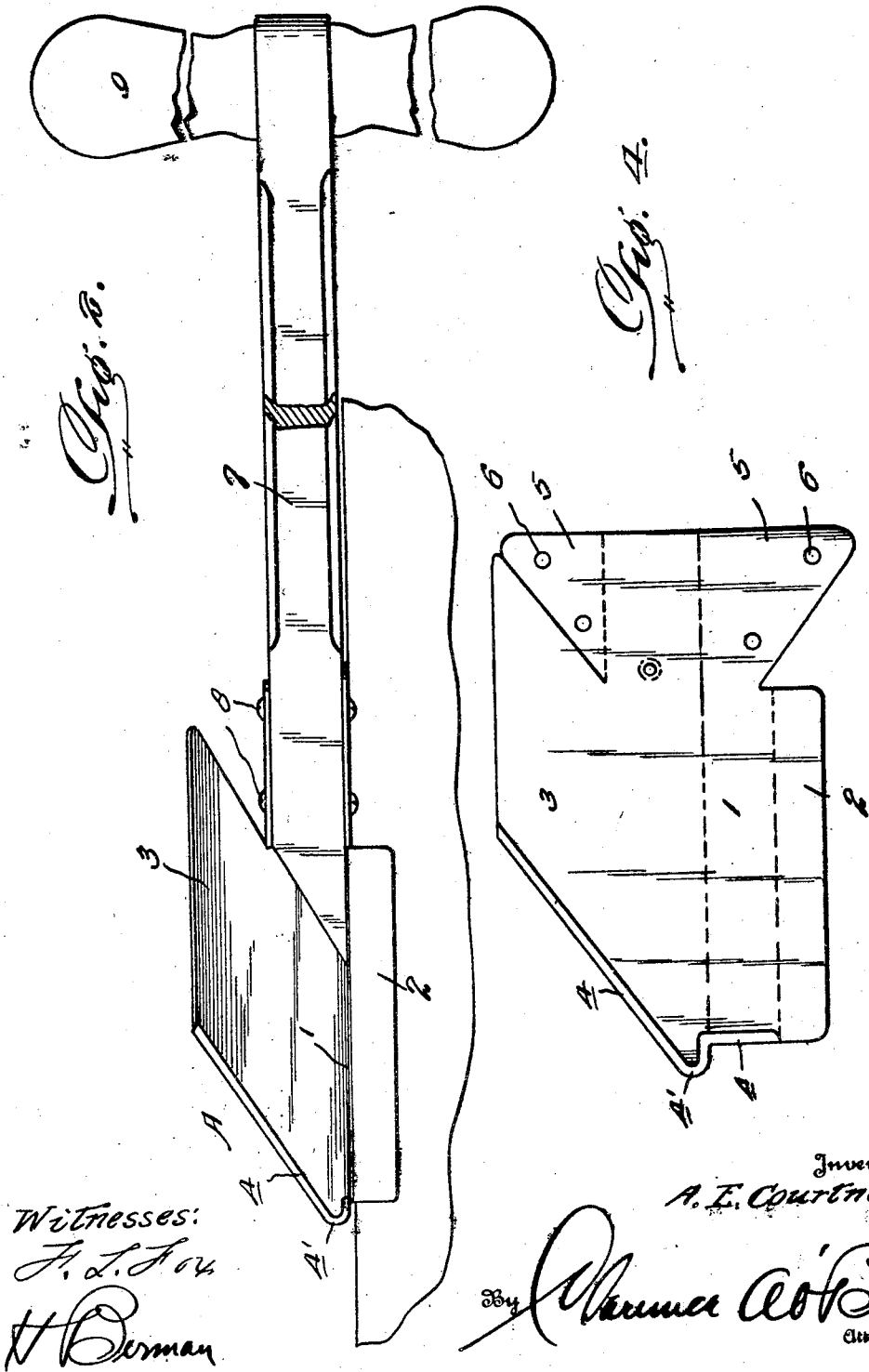

Patented Aug. 26, 1924.

1,506,410

UNITED STATES PATENT OFFICE.

ARRA E. COURTNEY, OF KANSAS CITY, MISSOURI.

LAWN-EDGE TRIMMER.

Application filed July 18, 1922. Serial No. 575,873.

*To all whom it may concern:*

Be it known that I, ARRA E. COURTNEY, a citizen of the United States, residing at Kansas City, in the county of Jackson and State of Missouri, have invented new and useful Improvements in Lawn-Edge Trimmers, of which the following is a specification.

In carrying out the present invention it is my purpose to provide a lawn edge trimmer which will be found especially useful for trimming the marginal edges of lawns at the point where the lawn joins the sidewalk, so that the margin of the lawn may present a neat and ornamental appearance.

It is also my purpose to provide a lawn trimmer wherein the blade may be stamped from a single sheet of metal and formed in such manner that the desired contour may be given to the lawn at the marginal edge thereof.

A further object of my invention is to provide a lawn trimmer which will embrace the desired features of simplicity, efficiency and durability, and which may be manufactured and marketed at comparatively small cost.

With the above recited objects in view, and others of a similar nature, the invention resides in the construction, combination and arrangement of parts set forth in and falling within the scope of the appended claims.

In the accompanying drawings:

Figure 1 is a side elevation of a lawn trimmer constructed in accordance with my invention.

Figure 2 is a top plan view of the same.

Figure 3 is a sectional view on the line 3—3 of Figure 1.

Figure 4 is a plan view of the blank from which the blade of my lawn edge trimmer is formed.

Figure 5 is a fragmentary sectional view through the lawn and sidewalk showing the marginal edge of the lawn as trimmed with my tool.

Referring now to the drawings in detail, A designates the blade of my improved lawn trimming tool. This blade is formed from a single sheet of metal bent upon itself longitudinally upon one side of the center line to provide a vertical sidewalk engaging section 1 and a horizontal sidewalk engaging section 2 at right angles to the section 1 at the top edge of the latter. The major portion of the blank is bent upwardly to provide a lawn engaging blade 3 that is arranged at an acute angle to the section 1, as clearly shown in Figure 3 of the drawings. The forward edges of the sections 3 and 1 are formed to provide cutting blades 4 and at the junction of the sections 1 and 3 a cutting blade or point 4' is provided. At the rear edge the metal is stamped to provide upwardly extending securing flanges 5—5 that extend in a vertical direction behind the sections 1 and 3, respectively, and these flanges 5—5 are formed with rivet holes 6 that aline with each other. 7 designates a handle, the lower end of which is disposed between the flanges 5—5 and secured thereto by means of screws 8 that pass through the handle and the openings 6 in the flanges. The upper end of the handle 7 is provided with a hand hold 9 by means of which the tool may be operated.

As shown in Figures 1 and 2 of the drawings, the handle 7 projects rearwardly and upwardly from the sections or blades of the tool.

In practice, the tool is engaged with the marginal edge of the lawn at the junction of the lawn with the sidewalk with the blade or section 3 lying next to the lawn and the blades or sections 1 and 2 engaging respectively the side and top of the sidewalk, as clearly shown in Figure 2 of the drawings. The tool is now pushed over the lawn at the marginal edge thereof and in this operation of the tool the blades or cutting edges 4—4 and 4' remove the grass, dirt, etc., so as to give to the marginal edge of the lawn a neat and attractive appearance, as illustrated in Figure 5 of the drawings.

I have entered into a detailed description of the construction and relative arrangement of parts embraced in the present and preferred embodiment of my invention with a view to imparting a full, clear and exact understanding of the said embodiment. I do not desire, however, to be understood as confining myself to the said specific construction and relative arrangement of parts, inasmuch as in the future practice of my invention such changes or modifications may be made as fairly fall within the scope of my invention as defined by my appended claim.

Having thus described the invention, what is claimed as new, is:—

A device of the character described made from a single piece of metal to form a handle receiving member and a head, the head comprising a flat vertical side piece and an obliquely disposed flat outwardly extending side piece directly connected at their bottom edges, the first side piece being bent outwardly at its upper edge to form a flat outwardly extending guide flange, the oblique side piece extending to a point in advance of the other side piece and the guide flange, and the side pieces having front sharpened cutting edges, said handle receiving member being U-shaped in cross-section and triangular in side elevation.

In testimony whereof I affix my signature.

ARRA E. COURTNEY.